(12) United States Patent
Liu et al.

(10) Patent No.: US 9,225,409 B2
(45) Date of Patent: *Dec. 29, 2015

(54) METHOD AND APPARATUS FOR OPEN LOOP TRANSMISSION IN A MULTIPLE ANTENNA WIRELESS COMMUNICATION SYSTEM

(71) Applicant: Huawei Technologies Co., Ltd.

(72) Inventors: Jianghua Liu, Beijing (CN); Anahid Robert Safavi, Kista (SE); Branislav Popovic, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/309,624

(22) Filed: Jun. 19, 2014

(65) Prior Publication Data

US 2015/0092874 A1    Apr. 2, 2015

Related U.S. Application Data

(63) Continuation of application No. 14/042,393, filed on Sep. 30, 2013, now Pat. No. 8,787,485, which is a continuation of application No. PCT/CN2011/072315, filed on Mar. 30, 2011.

(51) Int. Cl.
*H04B 7/04* (2006.01)
*H04L 5/00* (2006.01)
*H04L 25/03* (2006.01)

(52) U.S. Cl.
CPC ............ *H04B 7/0486* (2013.01); *H04L 5/0001* (2013.01); *H04L 25/03942* (2013.01)

(58) Field of Classification Search
CPC ............ H04B 7/0486; H04L 25/03942; H04L 5/0001; H04L 5/0051; H04L 5/0053; H04L 5/0023; H04L 5/0007; H04L 5/005; H04L 25/0226; H04L 5/0032; H04L 5/0057; H04L 5/006; H04L 1/00; H04L 1/0015

See application file for complete search history.

(56) References Cited

U.S. PATENT DOCUMENTS 8,428,018 B2  4/2013  Noh et al.
8,467,469 B2  6/2013  Lee (Continued)

FOREIGN PATENT DOCUMENTS

| CN | 101911525 A | 12/2010 |
| CN | 101938366 A | 1/2011 |
| WO | 2009091307 A1 | 7/2009 |
| WO | 2010145068 A1 | 12/2010 |

OTHER PUBLICATIONS

3rd Generation Partnership Project; Technical Specification Group Radio Access Network; Evolved Universal Terrestrial Radio Access (E-UTRA); Physical Channels and Modification (Release 10), 3GPP TS 36.211, V10.1.0, Mar. 2011, 103 pages.

(Continued)

*Primary Examiner* — Hirdepal Singh
(74) *Attorney, Agent, or Firm* — Slater & Matsil, LLP

(57) ABSTRACT

The invention concerns a method for precoding in an open loop transmission communications system, wherein the method includes precoding data at each of M REs with a precoding matrix, precoding each of DM-RSs with one column of a precoding matrix which is same as that used for precoding M data REs. The method is distinguished by using at least $L \geq 2$ different precoding matrices from a set of precoding matrices W to precode the M REs and the E allocated REs such that REs precoded with a first precoding matrix are interleaved with REs precoded with at least one additional, different precoding matrix and the number of used precoding matrices L is adapted to the transmission rank r and number N of available DM-RS. The invention further concerns a radio transmitter and a user equipment.

20 Claims, 4 Drawing Sheets

(56) References Cited

U.S. PATENT DOCUMENTS

| | | |
|---|---|---|
| 8,611,449 B2 | 12/2013 | Tang |
| 8,649,793 B2 | 2/2014 | Hu et al. |
| 8,665,972 B2 | 3/2014 | Kim et al. |
| 2010/0265841 A1 | 10/2010 | Rong |
| 2010/0284484 A1 | 11/2010 | Joengren et al. |
| 2011/0194551 A1* | 8/2011 | Lee et al. ............. 370/342 |
| 2012/0114021 A1 | 5/2012 | Chung |
| 2012/0207084 A1 | 8/2012 | Seo |
| 2012/0275414 A1* | 11/2012 | Hu ............. H04B 7/0452 370/329 |
| 2013/0114656 A1* | 5/2013 | Sayana ............. H04B 7/024 375/219 |
| 2013/0178221 A1 | 7/2013 | Jung |
| 2013/0235839 A1* | 9/2013 | Kim ............. H04L 5/0092 370/329 |
| 2014/0321306 A1* | 10/2014 | Nam et al. ............. 370/252 |
| 2014/0348109 A1* | 11/2014 | Chen et al. ............. 370/329 |
| 2015/0085742 A1* | 3/2015 | Chung ............. H04B 7/155 370/315 |

OTHER PUBLICATIONS

3rd Generation Partnership Project; Technical Specification Group Radio Access Network; Evolved Universal Terrestrial Radio Access (E-UTRA); Physical layer procedures (Release 10), 3GPP TS 36.213, V10.1.0, Mar. 2011, 115 pages.

IEEE Standard for Local and metropolitan area networks, Part 16: Air Interface for Fixed and Mobile Broadband Wireless Access Systems, Amendment 2: Physical and Medium Access Control Layers for Combined Fixed and Mobile Operation in Licensed Bands and Corrigendum 1, IEEE computer and the IEEE Microwave Theory and Techniques Society, IEEE Std 802.16e-2004 (Oct. 2004) and IEEE Std 802.16/2004/Cor1-2005 (Feb. 2006), 864 pages.

Qualcomm Incorporated, "Remaining details of feedback or TM9," 3GPP TSG-RAN WG1 #63bis, R1-110338, Dublin, Ireland, Jan. 17-21, 2011, 10 pages.

Intel Corporation Ltd., "Standardized UE-RS Based Open Loop SU-MIMO," 3GPP TSG RAN WG1 Meeting #64, R1-110976, Taipei, Taiwan, Feb. 21-25, 2011, 4 pages.

* cited by examiner

METHOD AND APPARATUS FOR OPEN LOOP TRANSMISSION IN A MULTIPLE ANTENNA WIRELESS COMMUNICATION SYSTEM

This application is a continuation of U.S. patent application Ser. No. 14/042,393, filed on Sep. 30, 2013, which is a continuation of International Patent Application No. PCT/CN2011/072315, filed on Mar. 30, 2011, which are hereby incorporated herein by reference in their entireties.

TECHNICAL FIELD

The present invention concerns a method for precoding in an open loop transmission in a wireless multiple antenna radio communications system. Further, it concerns a radio transmitter and a user equipment.

BACKGROUND

The term user equipment (UE for short) in this application means the (potentially moving) piece of equipment that communicates with the fixed network of radio transceivers called base stations in a mobile communications network. In different standards or circumstances it may be named differently, such as a terminal. The term user equipment used herein is, however, meant to encompass any such differently named equipment that serves the purpose mentioned above.

Likewise, nodeB or eNodeB (eNB for short) is a term often used within the Long Term Evolution (LTE) mobile communications network framework. However, the use of these terms in this application should not be interpreted to restrict the invention to the LTE framework. Rather, they should be interpreted in the broader sense as a radio basestation in any suitable mobile communications system.

In a wireless communication system it is well known that utilizing linear precoding at the transmitter side with multiple antennas can improve the performance substantially. FIG. 1 shows the block diagram related to downlink (DL) transmission with linear precoding in 3GPP LTE (Long Term Evolution) Rel-8/9/10 system.

Antenna ports shown in FIG. 1 convey the multiple transmitted signals that are spatially separable at the receiver. An antenna port is defined by its associated reference signal (RS). In practice, an antenna port may be implemented either as a single physical transmit antenna, or a combination of multiple physical antenna elements. Some proprietary operation might be implemented prior to mapping antenna port onto physical antenna elements. In either case, the signal transmitted from each antenna port is not designed to be further deconstructed by the receiver.

Layers are defined as strings or vectors of the modulated symbols to be transmitted on different antenna ports.

Channel State Information

In the connection of this application, knowledge of the term CSI may be useful. CSI is short for Channel State Information. There are basically two levels of CSI, namely instantaneous CSI and statistical CSI.

Instantaneous CSI (or short-term CSI) means that the current channel conditions between a transmitter and a receiver are known, which can be viewed as knowing the impulse response of a digital filter. This gives an opportunity to adapt the transmitted signal to the impulse response and thereby optimize the received signal for spatial multiplexing or to achieve low bit error rates.

Statistical CSI (or long-term CSI) means that a statistical characterization of the channel is known. This description can include, for example, the type of fading distribution, the average channel gain, the line-of-sight component, and the spatial correlation. As with instantaneous CSI, this information can be used for transmission optimization.

The CSI acquisition is practically limited by how fast the channel conditions are changing. In fast fading systems where channel conditions vary rapidly under the transmission of a single information symbol, only statistical CSI is reasonable. On the other hand, in slow fading systems instantaneous CSI can be estimated with reasonable accuracy and used for transmission adaptation for some time before being outdated.

In practical systems, the available CSI often lies in between these two levels; instantaneous CSI with some estimation/quantization error is combined with statistical information.

Linear Precoding

The purpose of linear precoding is to match the instantaneous channel properties and allows coherent combining of the transmitted signals at the receiver side and reducing the inter-layer interference thereby improving received SINR (Signal to Interference and Noise Ratio). Different linear precoding schemes have been implemented in IEEE 802.16-2005 and in LTE Release-8/9/10 standards.

One of these well-known linear precoding schemes is known as closed loop precoding i.e. channel-dependent precoding. In order to perform closed loop precoding in the downlink, the receiver, also known as the user equipment (UE), has to estimate the corresponding channel and report the estimated channel information to eNB for precoding. In order to reduce the overhead of directly reporting quantized estimated channel, a codebook consisting of a number of precoding matrices roughly representing the true channel may be defined. The UE uses the knowledge of estimated channel for selecting an appropriate precoder (PMI) from the defined codebook, transmission rank and estimated CQI (Channel Quality Information). These fundamental values are the CSI (Channel State Information) mentioned above, and are fed back to the transmitter i.e. NodeB. Once receiving this information NodeB performs scheduling for downlink transmission for the UE.

For example, LTE Rel.8 standard uses a precoding matrix codebook consisting of 64 matrices for up to 4 transmit antennas and different ranks Therefore, UE can feed back the appropriate precoder to represent the estimated DL channel using only 6 information bits instead of a large number of channel quantization bits.

It is important to notice that for closed loop precoding, the selected precoding matrix based on instantaneous channel knowledge at time t will be used for precoding at time T (T>t) due to the processing time needed for channel measurement, precoding matrix selection and the propagation time for reporting precoding matrix or signaling. As the channel is time varying, the appropriate selected precoding matrix at time t may be obsolete and not match the channel at time T when the channel varies fast in time such as high mobility scenarios. The result is that the modulation and coding scheme (MCS) determined by the CQI (Channel Quality Information) corresponding to the reported precoding matrix at time t will not be suitable for transmission at time T, which may degrades the performance. Hence, in order to achieve the closed loop precoding gain, the channel over time should vary slowly, i.e. low mobility.

Closed loop precoding schemes are used extensively in LTE Rel-8/9/10. For example PDSCH (Physical Downlink Shared Data Channel) transmission modes 4, 8 and 9 known as spatial multiplexing use closed loop techniques.

For above mentioned reasons and for specific scenarios such as high mobility, open loop precoding known as channel-independent precoding scheme is also used in LTE Rel-8 which is known as transmission mode 3.

A major difference between the closed loop and open loop scheme is that in the open loop scheme the used precoding matrices are predefined and there is no precoding matrix selection. As both eNB (transmitter) and UE (receiver) knows the predefined precoding matrices, the UE only feeds back CQI and selected rank. In the case of open loop precoding this CQI corresponds to an average CQI over the channel. Average CQI over the channel is computed by averaging CQI over a set of the predefined precoders known both at the UE and eNodeB side.

As described above, the antenna port conveying the transmitted signal is defined by its associated Reference Signal (RS). The RS is used to estimate the channel for measurement and demodulation.

In LTE Rel-8 DL transmission, Cell-specific Reference Signals (CRS) are defined for both measurement and demodulation. The CRSs are broadcasted and common to all the UEs in the cell, and each CRS defines one antenna port. The number of antenna ports for eNB can be configured as 1, 2 and 4, and the corresponding antenna port numbering is {0}, {0, 1} and {0, 1, 2, 3}.

In LTE Rel-8, for PDSCH (Physical Downlink Shared Channel) transmission using linear precoding, the output of precoding is mapped into a number of antenna ports defined by CRS as illustrated in FIG. 2 (assuming four antenna ports).

To perform demodulation in this case, the UE needs to know the transmission channel between the antenna ports and the receiver, and also the used precoding matrix. The transmission channel can be obtained by performing channel estimation based on CRS. The used precoding matrix is explicitly signalled in the physical downlink control channel (PDCCH) in the form of signalling PMI (Precoder Matrix Indication).

In LTE Rel-10 DL transmission, the Reference Signals (RSs) for measurement and demodulation are decoupled to CSI reference signals (CSI-RS) and User Equipment (UE)-specific reference signals. The CSI-RS is used for measurement, which is cell-specific and is common to all the Rel-10 UEs in the cell. Compared to the CRSs in LTE Rel-8, the CSI-RS has lower density in the frequency and time domain. The UE-specific reference signal is used for PDSCH (Physical Downlink Shared Channel) demodulation, which is only transmitted in the scheduled resource block (RB) for a certain UE. UE-specific reference signal is denoted as DM-RS (Demodulation Reference Signal).

For PDSCH demodulation using DM-RS, the same precoding scheme is applied to both DM-RS and PDSCH. The DM-RS is used to estimate the precoded channel, and therefore the number of DM-RSs would be equal to the number of layers of PDSCH or rank. As each DM-RS defines one antenna port, the number of DM-RS antenna ports used for PDSCH transmission would depend on transmission rank. Up to eight DM-RS antenna ports {7, 8, 9, 10, 11, 12, 13, 14} are defined to support up to eight layers transmission in LTE Rel-10.

As the DM-RS is precoded, UE can obtain the transmission channel and the used precoding matrix together by performing channel estimation based on DM-RS. Hence the PMI information does not need to be included in the PDCCH. In this case, PDSCH is directly mapped onto the antenna ports defined by DM-RS as illustrated in FIG. 3, which is the case of rank 4 transmission corresponding to transmission via antenna ports {7, 8, 9, 10}. It is important to notice that the precoder in this case can be a proprietary precoder and is not defined in the specification.

RS pattern defined for four antenna ports (7~10) and related DM-RS in normal sub-frame are shown in FIG. 4.

In Rel-8 an open loop precoding scheme which is known as transmission mode 3 is designed to be used in high mobility scenarios, see TS36.213, "Evolved Universal Terrestrial Access (E-UTRA); Physical Layer Procedures", Release 10, referenced as [2] below. This transmission mode uses open loop transmit diversity scheme (TxD) when the transmission rank is 1, otherwise, it uses large delay CDD (Cyclic Delay Diversity) precoding.

For large delay CDD, precoding is defined by:

$$\begin{bmatrix} z^{(0)}(i) \\ z^{(1)}(i) \\ \vdots \\ z^{(P-1)}(i) \end{bmatrix} = W(i)D(i)U \begin{bmatrix} x^{(0)}(i) \\ x^{(1)}(i) \\ \vdots \\ x^{(v-1)}(i) \end{bmatrix}$$

Where P denotes the number of antenna ports, v denotes transmission rank. $[x^{(0)}(i)x^{(1)}(i) \ldots x^{(v-1)}(i)]^T$ represents the block of data vectors from the layer mapping according to FIG. 1 and $[z^{(0)}(i)z^{(1)}(i) \ldots z^{(P-1)}(i)]^T$ is the block of vectors to be mapped on resources on each of the antenna ports. Precoding matrix W is of size P×v and i=0, 1, . . . , M with M being the number of modulation symbols per layer. The matrix D(i) is supporting cyclic delay diversity and matrix U is of size v×v. These matrices are specified and are given in reference TS36.211, "Evolved Universal Terrestrial Access (E-UTRA); Physical Channels and Modulation", Release 10 (referenced as [1] below) for different number of layers v.

In the case of 4 antenna ports, the receiver or UE assumes that the transmitter or eNodeB cyclically assigns different precoders to different vectors $[x^{(0)}(i)x^{(1)}(i) \ldots x^{(v-1)}(i)]^T$ on PDSCH. A different precoder is used every v vectors. Different precoders are selected from Table 6.3.4.2.3-2 of [1]. Due to the precoder cycling, several precoding matrices are used in one RB.

The precoder cycling achieves an average Channel Quality Information (CQI) over a number of different channels by using different precoders. Therefore, this method is more robust to channel variation than that of the closed loop precoding which represents only the best instantaneous channel and the best related precoder.

On the top of precoder cycling done by the use of several W(i), layer permutation is also performed for each precoder by using matrices D(i) and U. The layer permutation for each precoder enables the two codewords (when there is more than one layer transmission) to have the same CQI, and therefore reporting only one CQI is sufficient which reduces CQI feedback overhead.

In this open loop transmission mode, Cell-specific Reference Signals (CRSs) are used to obtain channels corresponding to each antenna port. Moreover, the precoders used for cycling are known according to a predefined rule by both the transmitter (NodeB) and the receiver (UE). The UE will compute the average CQI from the knowledge of channel and set of the predefined precoders.

This prior art is not applicable for the case of using UE-specific reference signals for demodulation, where there is no signalling to determine precoding matrices. Moreover, in this described prior art, cell-specific reference signals (CRS) are used to estimate the transmission channel.

Another prior art can be found in R1-110338, "Remaining details of feedback for TM9", 3GPP RAN1 #63b, Qualcomm (referenced as [4] below). This proposal is an extension of open loop precoding defined in Rel-8 which is described above. This contribution is a first attempt to use UE-specific reference signals to achieve precoder cycling suitable for open loop MIMO.

More precisely, in [4], a precoder $W(i_{RB})$ (which is assumed constant per RB) is applied on UE-specific reference signals specified for Rel-10 (DM-RS). This can be written as the following:

$$\begin{bmatrix} z^{(0)}(i) \\ z^{(1)}(i) \\ \vdots \\ z^{(P-1)}(i) \end{bmatrix} = W(i_{RB}) \begin{bmatrix} r^{(0)}(i) \\ r^{(1)}(i) \\ \vdots \\ r^{(v-1)}(i) \end{bmatrix}$$

In the above equation $W(i_{RB})$ denotes the RB-specific precoder and v denotes transmission rank. $[r^{(0)}(i) r^{(1)}(i) \ldots r^{(v-1)}(i)]^T$ denotes the data for different layers. As per previous contribution, average CQI is assumed being evaluated over a set of predefined precoders which are known to both receiver (UE) and transmitter (NodeB) and the channel is estimated from cell-specific CSI-RS. It is also assumed that the set of predefined precoders are cyclically used in different RBs.

It is known from large delay Cyclic Delay Diversity (CDD) precoding of Rel-8 that the matrix D(i) and U supports layer permutation which provides the same CQI for both two codewords for larger than rank one transmission and consequently reducing feedback overhead. Therefore, in another prior art R1-110976, "Standardized UE-RS based open loop SU-MIMO", 3GPP RAN1 #64, Intel (referenced as [3] below), which is an extension of [4], it is proposed to use not only precoding $W(i_{RB})$ on UE-specific reference signals but also per subcarrier large delay CDD (D(i)U). Corresponding downlink (PDSCH) transmission can be written as the following:

$$\begin{bmatrix} z^{(0)}(i) \\ z^{(1)}(i) \\ \vdots \\ z^{(P-1)}(i) \end{bmatrix} = W(i_{RB})D(i)U \begin{bmatrix} x^{(0)}(i) \\ x^{(1)}(i) \\ \vdots \\ x^{(v-1)}(i) \end{bmatrix}$$

As mentioned before, precoding operation is predefined for both UE and eNodeB. However, UE does not know how D(i) is used for different resource elements.

As introduced in the background, Downlink (DL) precoding using antenna ports with UE-specific reference signals is only optimized for closed loop i.e. low mobility. Further evolution of Rel.10 for high mobility scenarios will reuse UE-specific reference signals to guarantee the backward compatibility, simplifying the design and keeping the signalling overhead lower. Hence the problem to resolve is how to improve the precoding performance at high mobility using antenna ports defined by UE-specific reference signals without signalling the used precoders while achieving the best performance.

Thus, there is always a need for improvements and thus the present application sets out to provide a new scheme with improved characteristics.

SUMMARY OF THE INVENTION

It is an object of an aspect of the present invention to propose a solution for or a reduction of the problems of prior art. A main object is consequently to provide an open loop transmission scheme with precoded demodulation reference signals having improved characteristics.

According to an aspect of the invention this is accomplished with a method for precoding in an open loop transmission in a wireless multiple antenna radio communications system, wherein the system:

provides for rank adaptation for data transmission with selected transmission rank r being $1 \leq r \leq R$, where R is maximum available transmission rank of the communication system, communicates resource units (RU) containing resource elements (RE), provides N available Demodulation Reference Signals (DM-RS) for communication channel estimation in each RU, provides a number of M REs in each RU for data transmission, and provides a number of E REs in each RU allocated for DM-RS transmission.

The method includes:

applying a number, $N_{used}$, of DM-RS:s, $N_{used} \leq N$, to the E allocated REs, precoding the data at each of the M REs within each RU with a precoding matrix and the same precoding matrix is used for all of the M REs within each RU, Precoding each of $N_{used}$ DM-RSs over the E allocated REs within each RU with one column of a precoding matrix which is same as that used for precoding M data REs.

The method is distinguished by, when precoding, using at least $L \geq 2$ different precoding matrices from a set of precoding matrices W to precode the M REs and the E allocated REs in at least one RU for at least one certain rank r transmission such that REs precoded with a first precoding matrix are interleaved with REs precoded with at least one additional, a second different precoding matrix, and wherein the number of used precoding matrices L is adapted to the transmission rank r and number N of available DM-RS.

An advantage of this scheme compared to that of [4] and [3] is that the precoder cycling granularity is denser with resource elements precoded with different precoders in an interleaved fashion (rather than continuous blocks of resource elements precoded with the same precoder as in [4] and [3]), which should improve the reliability of average Channel Quality Information (CQI) at high mobility. Furthermore, the solution of an aspect of the invention does not suffer from a scheduling constraint that at a close look is inherent in [4] and [3], namely that in [4] and [3] the number of scheduled resource units (for instance resource blocks RBs in LTE) must be larger than the precoder cycling periodicity; otherwise the CQI cannot be averaged over all the predefined precoders and the CQI is less reliable.

Thus, an aspect of the present invention provides a solution where there are several random precoders used over one resource unit, for instance a resource block in LTE. This case is of interest because the inventors expect that the use of several precoders over the same resource unit will provide a more reliable CQI estimate and consequently guarantee a better performance for high mobility. Moreover, as mentioned above, there is no scheduling restriction based on this scheme.

An aspect of the present invention optimizes the precoding performance at high mobility in the context of using UE-specific reference signals. The benefit is to reuse the designed UE-specific reference signals for simplification and avoid the signalling of precoding matrix. An improved measurement is obtained as per use of different precoders over each resource unit such as a resource block in LTE.

The object of an aspect of the invention is also accomplished with a radio transmitter adapted to do transmissions in accordance with the method of the invention and with a user equipment adapted to receive a transmission from the radio transmitter according to the invention.

The radio transmitter and the user equipment have advantages corresponding to those of the method of the invention.

Further advantageous embodiments of the invention are disclosed in the dependent claims.

BRIEF DESCRIPTION OF THE DRAWINGS

Embodiments exemplifying the invention will now be described, by means of the appended drawings, on which

DETAILED DESCRIPTION OF ILLUSTRATIVE EMBODIMENTS

The invention will now be described within the context of the mobile communications system Long Term Evolution (LTE). It should be pointed out that the principle of the invention is not limited to the LTE standard, but could be applied in any communication system having the right characteristics, as is apparent below. However, LTE serves as convenient example and is therefore used below.

Figure 1:
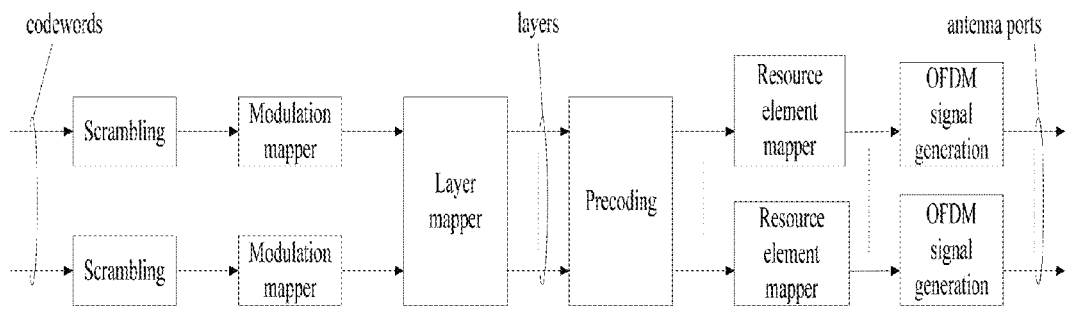
FIG. 1 illustrates an overview of downlink physical channel processing.
Figure 2:
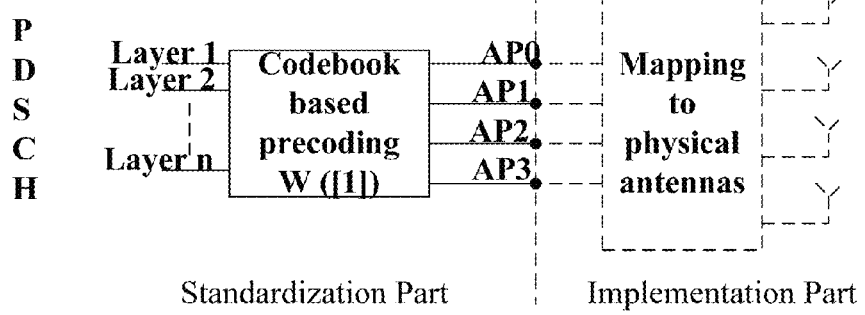
FIG. 2 illustrates the relation between precoding matrix and CRS antenna ports.
Figure 3:
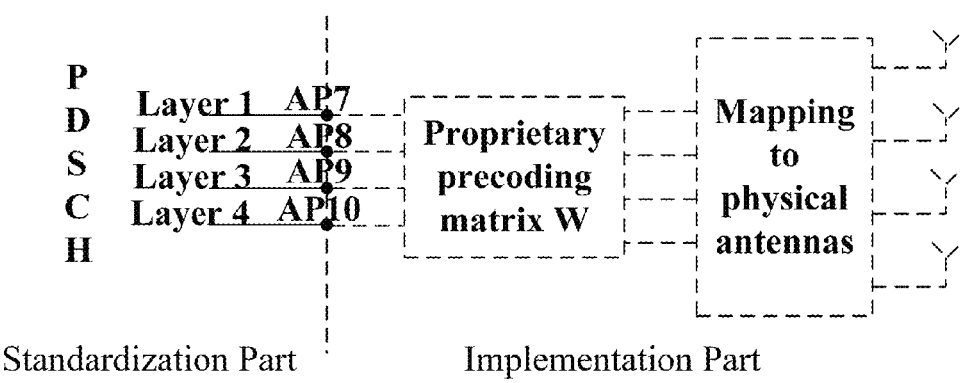
FIG. 3 illustrates the concept of antenna ports (UE-specific reference signals)
Figure 4:
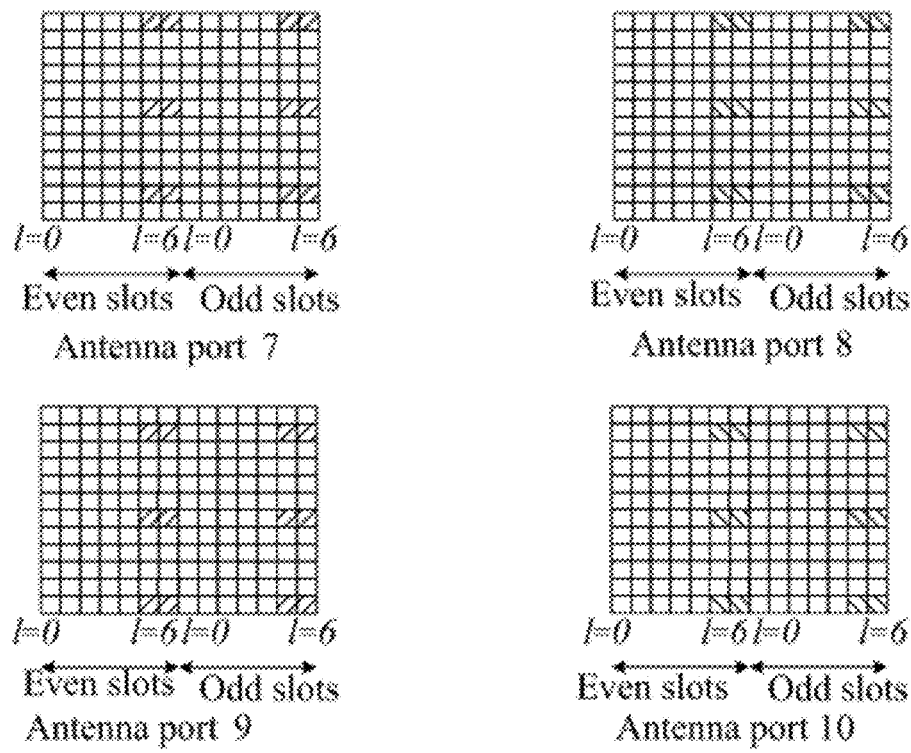
FIG. 4 illustrates RS pattern for UE-specific reference signals and related antenna ports.

As an example, a reference signal (RS) pattern related to UE-specific reference signals and antenna ports in an LTE system are shown in FIG. 4. UE-specific reference signals related to antenna port 7 and 8 are multiplexed on the same REs using code-division multiplexing (CDM). CDM is also used to separate UE-specific reference signals related to antenna port 9 and 10. Moreover, UE-specific reference signals related to antenna port 7 and 8 versus 9 and 10 are separated using frequency division multiplexing over different resource elements (REs). When the length of code used to separate antenna port 7 and 8 (or 9 and 10) is 4, two more UE-specific reference signals can be supported at each group of REs, which are associated respectively with antenna port 11 and 12 (or 13 and 14) which is not shown in this Figure. Hence maximum number of 8 UE-specific reference signals can be supported: two groups of REs with four code multiplexed reference signals in each.

For the UE-specific reference signals, the number of occupied REs depends on the transmission rank. When the rank is 1 or 2, there are 12 REs used for UE-specific reference signals i.e. the REs for antenna ports 7 and 8. When the rank is larger than 2, there are 24 REs including all the REs for antenna ports 7~14 are used for UE-specific reference signal.

In LTE Rel-10 DL for Physical Downlink Shared Channel (PDSCH) transmission using UE-specific reference signals, it is assumed that only one precoding matrix is used at all the REs for PDSCH in one RB pair (which is defined as RBs over two slots in one sub-frame). In order to estimate the channel of each antenna port, one UE-specific reference signal is transmitted from each antenna port. Thus the number of UE-specific reference signals in one RB is equal to the number of layers, i.e. rank.

Figure 5:
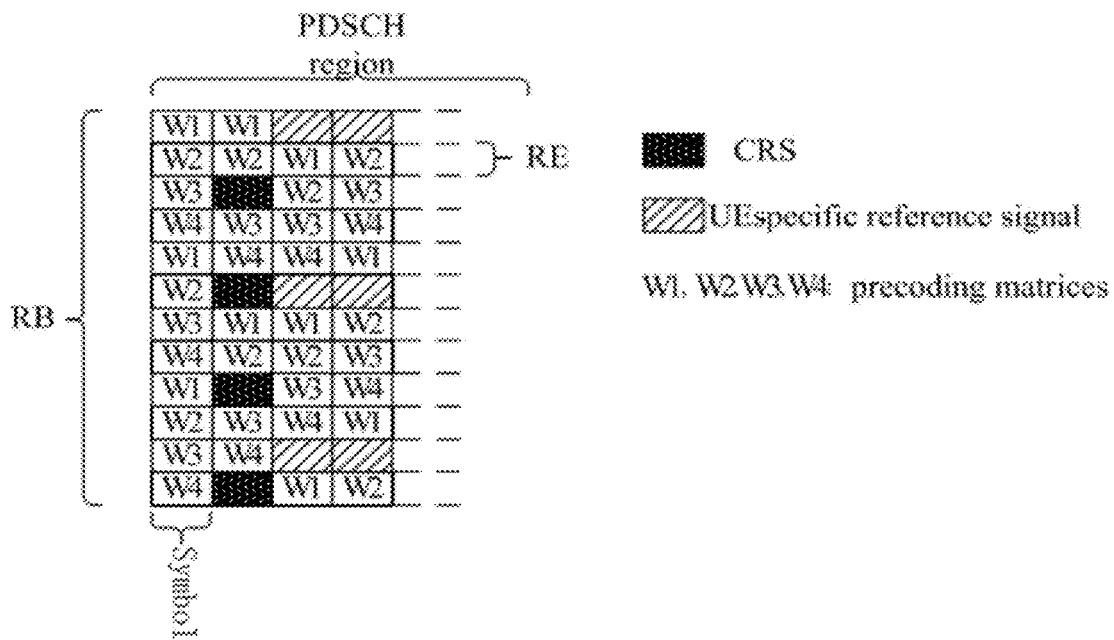
FIG. 5 illustrates an example of using multiple precoding matrices in one Resource Block (RB) in a Physical Downlink Shared Channel (PDSCH) region for one antenna port.

In order to support a high mobility scenario, more than one precoding matrix has to be used in one RB pair as in Rel-8 large delay CDD precoding with precoding matrix cycling to achieve robust Channel Quality Information (CQI). In this case, different REs for PDSCH in one RB pair may use different precoding matrices as well, as illustrated in FIG. 5. This calls for more UE-specific reference signals than in Rel.10 where only one precoding matrix has been used. As mentioned before, the number of used UE-specific reference signals for one used precoding matrix is equal to rank r. Therefore, in the context of using UE-specific reference signals for several precoding matrices, the number of required UE-specific reference signals is the product of rank r and M (the number of used precoding matrices). i.e.:

$$\text{required UE-specific reference signals} = r \times M$$

Figure 6:
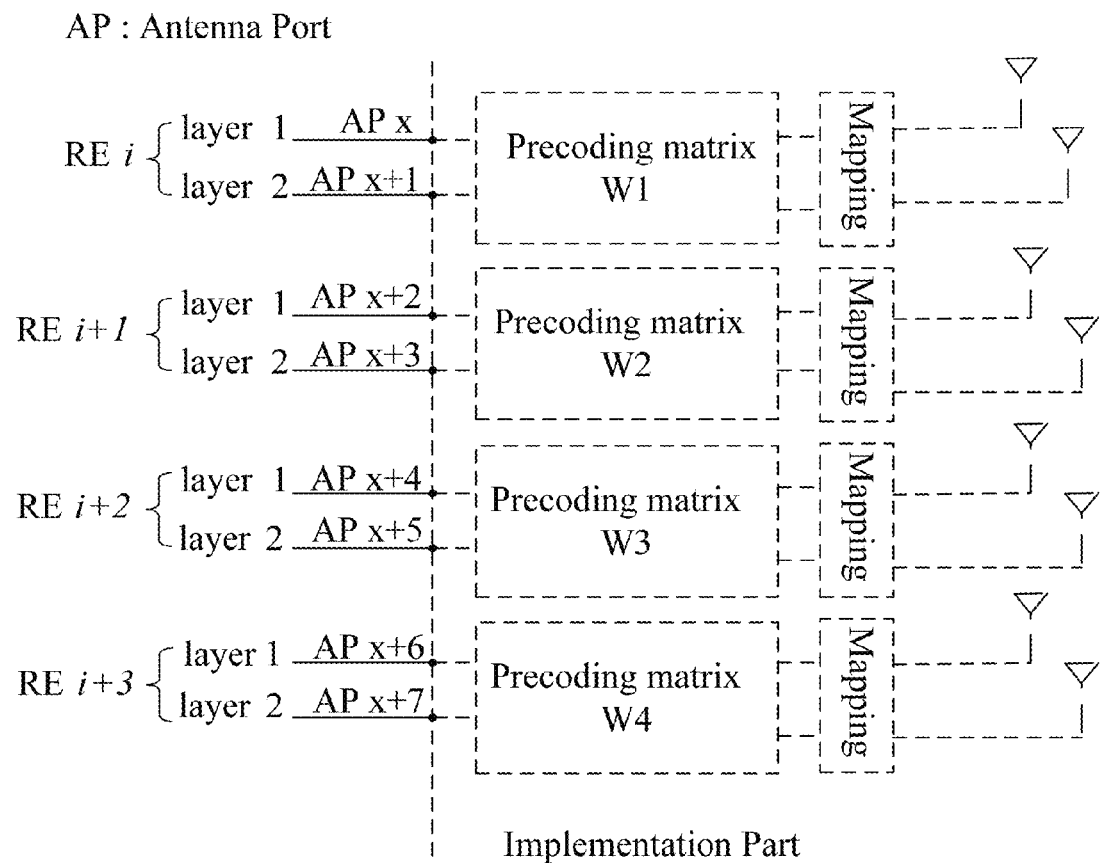
FIG. 6 illustrates of number of antenna ports related to the multiple precoding matrices.

For example four precoding matrices W1~W4 of rank 2 (2 layers) are used in one RB as shown in FIG. 6.

As there is one UE-specific signal per antenna port, the total number of UE-specific signals is eight. The number of UE-specific reference signals is limited and is already minimized considering the spectrum efficiency for data transmission.

Therefore, in the context of using UE-specific reference signals for several precoding matrices the number of used precoding matrices must be adapted to the transmission rank and the number of available UE-specific reference signals.

We will now summarize a baseline of the method of the invention for precoding in an open loop transmission in a wireless multiple antenna radio communications system. We will start off with some prerequisites of the radio communication system itself which could be an LTE system or any other system as long as it provides for rank adaptation for data transmission with selected transmission rank r being $1 \leq r \leq R$, where R is maximum available transmission rank of the communication system. That is to say that the system employs mechanisms to decide if there are one or more spatial communications channels available and also decide for a specific number of layers to transmit at any time instant.

The radio communication system further communicates resource units (RU) containing resource elements (RE). Resource elements are really slots in frequency and time in a radio band resource that the radio communication system is using and the resource unit represents a grouping of a plurality of such resource elements. These definitions are convenient when discussing the system and the method from a generic standpoint.

Further the radio communications system provides a number of N available Demodulation Reference Signals (DM-RS) for communication channel estimation in each RU.

Thus, these reference signals herein simply indicate what are sometimes called pilots or sounding signals.

The system further provides a number of M REs in each RU for data transmission and provides a number of E REs in each RU allocated for DM-RS transmission. So, in a resource unit there will be some space for data and some space for reference signals.

Now, against the backdrop of the described radio communications system, we turn to the method of the invention. We first describe what is done in the prior art and then the improvements of the invention. In the prior art, the following is carried out: applying a number, $N_{Used}$, of DM-RS:s, $N_{Used} \leq N$, to the E allocated REs. Thus, from the pool of N demodulation reference signals available in the system, a number, $N_{Used}$, of them are committed to the resource elements allocated to such signals in a resource unit of interest.

Further, precoding the data at each of the M REs within each RU with a precoding matrix and the same precoding matrix is used for all of the M REs within each RU, i.e. there is only one precoding matrix used in one resource unit.

Also, precoding each of $N_{Used}$ DM-RSs over the E allocated REs within each RU with one column of a precoding matrix which is same as that used for precoding M data REs. This means that the method of precoding used for the radio communication system, in addition to do precoding of data, also precodes the demodulation reference signals themselves. The precoding of such a demodulation reference signal is carried out with just a column from the precoding matrix since such a column corresponds to one layer or one antenna port and we need one demodulation reference signal to uniquely identify each of the antenna ports in the system. The advantage of precoding also the demodulation reference signals is that at the receiver side the receiver can estimate the physical transmission channel combined with the precoding together. That is, there is no need to signal which precoding matrix is used, since it is estimated in the receiver. Thus there will be less signalling overhead in the system. This fact is not dealt with more closely in the method of the invention, but is nevertheless implicit due to the explicit notion of precoded demodulation reference signals.

So, to summarize quite roughly, in the radio communication system under consideration where we employ precoded demodulation signals (as well as precoded data) we end up with a block (which we name a resource unit) of resource elements that are precoded with one and the same precoding matrix.

As an improvement, the method of the invention now suggests that precoding the data at each of the M REs within each RU with a precoding matrix from a set of matrices W is also done. Thus, in the system there is a set of W available precoding matrices from which more than one is taken to precode the (M) data resource elements in the resource unit of interest. Also, precoding each of $N_{used}$ DM-RSs over the E allocated REs within each RU with one column of a precoding matrix which is coming from a set of precoding matrices W is carried out.

Thus, when precoding, we will be using at least $L \geq 2$ different precoding matrices from a set of precoding matrices W to precode the M REs and the E allocated REs in at least one RU for at least one certain rank r transmission. In this way, REs precoded with a first precoding matrix are interleaved with REs precoded with at least one additional, a second different precoding matrix. Further, the number of used precoding matrices L is adapted to the transmission rank r and number N of available DM-RS. The adaptation is made since a certain number of available demodulation reference signals can only sustain a certain number of precoding matrices at a certain rank transmission. That is, these factors set an upper limit on the number of precoding matrices that can be used. This is due to, and it should be noted, that in addition to the data in a resource block being precoded with two or more precoding matrices, the demodulation reference signals are also at the same time precoded with (columns from) the same at least two or more precoding matrices. Each used precoding matrix brings a new channel that has to be estimated with the use of a demodulation reference signal.

Thus, instead of just using one precoding matrix for a resource unit, the method of the invention makes use of at least two of them up till the sustainable number under given conditions. This has the advantage that for an open loop scenario and during a rapidly changing communication channel, the precoding is done with a higher granularity compared with prior art systems. Therefore, the average transmission performance in the system in such a rapidly changing environment should be improved. The method of the invention leaves open the decision of exactly how many the two or more precoding matrices should be. This could be decided with respect to the circumstances and therefore flexibility is provided to balance throughput in the system to the overhead provided by the demodulation reference signals.

A variant of the method according to the invention is wherein the number N of available DM-RS depends on the number E of REs allocated for DM-RS:S in a RU and the length of code used for Code Division Multiplexing of DM-RS:S over the E REs.

Now, several further cases can be considered for the method:

Embodiment 1: In this case, all the available UE-specific reference signals N for rank r are used by NodeB, and therefore the number of used precoding matrix for rank r transmission would be $\lfloor N/r \rfloor$, where $\lfloor \ \rfloor$ takes the largest integer which is smaller than N/r.

For example, for rank 1 and 2 the number of maximum available UE-specific reference signals is 4. Therefore, 4 and 2 precoding matrices are used respectively for rank 1 and rank 2 for precoding data.

Embodiment 2: When, for instance, 12 REs in one resource unit (for example a RB pair in LTE) are utilized for reference signals to support rank 1~2 transmission, and provided a code multiplexing scheme with a code size of four is used, there are up to 4 code multiplexing UE-specific reference signals available. If the 4 available UE-specific reference signals are used for rank 1 and 2 transmission, there will be 4 and 2 precoding matrices respectively used in one RB pair. For the case of reference signals with 24 REs for rank 3~4 transmission, the 8 available UE-specific reference signals can support 2 rank-3 and 2 rank-4 precoding matrices for precoding data respectively.

The difference between embodiment 2 and embodiment 1 is that for embodiment 2 it is not necessary to use the maximum number of UE-specific reference signals and one could use available resources.

To summarize these two embodiments 1 and 2, the method according to the invention could be said to be further modified by using $N_{used} \leq N$ available DM-RS for rank r transmission, and wherein number L of used precoding matrices for precoding data is the largest integer smaller than $N_{used}/r$.

In another variant of the method according to the invention, the number of E REs allocated for DM-RS in each RU could depend on the selected transmission rank r. Thus, if it is established that certain ranks of transmission for instance benefits of more available reference signals, the method of the invention could in this way flexibly accommodate that.

Thus, to exemplify, a very specific instance of the method according to the invention would be:
E=12 REs are used in one resource unit for DM-RS,
rank is chosen as either of 1 or 2,
the length of CDM code is 4 and there are N=4 CDM DM-RS available, and
number L of used precoding matrices is the largest integer smaller than N/r.

Another specific example of the method according to the invention is:

E=24 REs are used in one resource unit for DM-RS, rank is chosen as either of 3 or 4, the length of CDM code is 4 and there are N=8 CDM DM-RS available, and number L of used precoding matrices is the largest integer smaller than N/r.

Embodiment 3: In this case, the same number of N available reference signals is used for different rank r. Assume that 24 REs in one RB pair are always used for reference signal regardless of rank. In this case, there are 8 UE-specific reference signals available for all different rank transmission. Therefore, the number of used precoding matrices for rank 1~4 will be 8, 4, 2 and 2 respectively for precoding data.

Thus, the method according to the invention would in this case be modified such that the same number N of available DM-RS:s are used for different rank r transmissions, and the number of used precoding matrices is the largest integer smaller than N/r.

Embodiment 4: A further embodiment is that the same number of precoding matrices for precoding data is assumed for each rank, and the number of used UE-specific reference signal is less than or equal to the maximum number $N_r$ of available reference signals for each rank. For example, it is assumed that 12 REs and 24 REs in one RB pair are used for reference signals to support rank 1~2 and rank 3~4 transmission respectively, and the maximum number of available UE-specific reference signals is 4, 4, 8 and 8. It can support the transmission of using two precoding matrices per rank for precoding data because the required number of UE-specific reference signal is 2, 4, 6 and 8 which are available.

This embodiment of the method according to the invention could be summarized as:

the number of available DM-RS for different rank r transmissions is $N_r$, same number of L precoding matrices is used for each transmission rank r, Number $N_{used}$ of used DM-RS≤$N_r$ available DM-RS for each rank r transmission is $N_{Used}$=L*r. As a variant of this embodiment, the method could be further modified as:

the number of available DM-RS $N_r$ for different rank r transmissions is the same.

To provide yet another example, the method according to the invention could be adapted such that the number of $N_{Used}$ DM-RS for rank r transmission is equal to r. This could be further modified such that the L precoding matrices used in one RU are obtained by permuting the columns or rows of one precoding matrix.

The above embodiments assume that multiple precoding matrices are used for precoding data in the available different ranks, such as for rank 1~4 in one RB pair in an LTE system. However, this is not a restriction in this invention and only part of rank (e.g. only rank 1 and 2) may well perform multiple precoding matrices in one resource unit (for instance a RB pair in LTE). Thus, the method according to the invention would then imply that multiple precoding matrices for only some of the available different transmission ranks is used in a resource unit.

Also, for the specific example of a RB pair in an LTE system as a resource granularity for precoding is only for illustration here, it can also be two RB pairs or others. For example, four precoding matrices with rank-2 are used in three consecutive RBs in the frequency domain. Thus in this specific case of the method of the invention, this can be express as: the resource unit is one Resource Block Pair in a Long Term Evolution mobile communications system, and the number of used precoding matrices in a number of consecutive Resource Block Pairs are at least the number of consecutive resource block pairs+1.

When there is a number of L(L≥1) precoding matrices used for precoding data in one resource unit (e.g. a RB pair in an LTE system) for a certain rank r, these precoding matrices can be cyclically used. Given that the L precoding matrices are indexed as l=0, 1, 2, . . . L−1 and the data vectors to be precoded are indexed as i=0, 1, . . . I−1, then the precoding matrix l=mod(i,L) will be used for precoding the data vector i. It is not restricted to have other kind of cycling, e.g. one precoding matrix is used for L consecutive data vectors and then it is changed to use another one different precoding matrix. Therefore, the method according to invention could involve using cycling of L≥1 precoding matrices in a resource unit or in consecutive resource units.

On the top of precoding cycling, layer permutation can also be used to enable two codewords to have the same CQI. The layer permutation is that the columns of precoding matrix are permuted and then the permuted precoding matrix is used for precoding. In this way, the precoding matrix l=⌊i/L⌋ and its permuted precoding matrix will be used for precoding data vectors i, where nL≤i≤(n+1)L−1,n is being an integer. A particular example is that the layer permutation can be performed by the large delay CDD precoding. Thus, a version of the method involving the cycling mentioned in the previous paragraph is to perform layer permutation by permuting the columns of L precoding matrices and then use the permuted precoding matrices for precoding.

In a further variant of the method according to the invention, each of the $N_{used}$ DM-RS in a resource unit defines one antenna port, and there are $N_{used}$ defined antenna ports. This variant could be extended by in that each data transmission RE is associated with r of $N_{used}$ defined antenna ports when the transmission rank is r. In a further extension of this, each data transmission RE is associated with same antenna ports with different order. For example, there are four DM-RS which defines four antenna ports as {0,1,2,3}; the used antenna ports at the first RE are 0,1,2,3, and the used antenna ports at the second RE are 1,2,3,0.

At the receiver, UE needs to know how these precoding matrices are used and mapped onto REs for correct detection, and therefore this information including the corresponding precoding operation and resource mapping shall be signaled to UE. It can be signalled explicitly by encoding a number of bits in PDCCH, or implicitly by predefining a certain rule which is known to both eNB and UE. Thus, the method according to the invention in this case could be said to further comprise signalling a scheme of used L precoding matrices to a receiver of precoded resource elements in the system.

When the UE-specific reference signal or DM-RS is used, the UE can estimate the channel corresponding to each antenna port, in which the used precoding matrix is included. Hence it is not needed to signal the precoding matrix in this case of using UE-specific reference signal. Instead, UE needs to know the association between the used antenna ports (or UE-specific reference signal) and REs, i.e. which antenna ports are used at different REs. Similarly, the signalling of the relation between antenna ports and REs can be explicit by for instance the PDCCH in an LTE system or an implicitly predefined rule.

For example, when there are 8 antenna ports or UE-specific reference signals as shown in FIG. 5, it can be predefined that the resource element on which the data vector i is mapped is associated with antenna port mod(i,4)*2 and mod(i,4)*2+1.

According to the predefined rule, the UE can correctly estimate the channel and detects the data on each RE.

We have described a method to achieve precoder cycling in the context of using UE-specific reference signals. However, it is worth to mention that precoder cycling can be considered for Channel Quality Information (CQI) measurements at UE side as well. Moreover, it is necessary that both the transmitter or eNB and UE have the same understanding on the CQI measurement procedure.

Several ways for precoder cycling can be considered for CQI measurement, as exemplified in, but not restricted to an LTE environment below:

First, a set of precoders is predefined for open loop precoding and the CQI is calculated at UE side assuming the set of predefined precoders is used, which is similar to LTE Rel.8 transmission mode 3. In this case, the difference between Rel-8 and further releases is that the precoders used for Physical Downlink Shared Channel (PDSCH) in LTE Rel-8 are predefined precoders, but, the precoders used for PDSCH in Rel-10 and further releases are proprietary. This procedure can be summarized as follows:

Average CQI from UE is reported to the eNodeB following the reporting procedure. Based on this information, eNodeB can presume that the reported CQI is based on the predefined precoding matrices. Thereafter, the corresponding CQI from the UE would be a reference for eNodeB scheduling. Based on the reference information, eNodeB may transform the presumed and predefined precoding matrices used for PDSCH transmission. Meanwhile eNodeB may adjust the reported CQI according to the relation between the predefined precoding matrices and the proprietary precoding matrices used for PDSCH transmission. In other words, both predefined precoding matrix and CQI are updated simultaneously in a proprietary way. After adjustment, the PDSCH is transmitted by using proprietary precoding matrices and the updated CQI.

These adjustments are important to prevent that CQI being computed on one set of precoders and PDSCH is precoded based on another set of precoders therefore introducing some mismatch between measurement and transmission in eNodeB.

Another alternative to compute average CQI can be considered as well. In this alternative UE extracts proprietary precoding matrices from the scheduled PDSCH. This is possible if the UE computes exact channel coefficients over the scheduled PDSCH bandwidth obtained from non precoded CSI-RS. Once information about used proprietary precoding matrices is obtained, the CQI will be estimated based on the extracted proprietary precoding matrices. Thus average CQI related to proprietary matrices can be reported. Contrary to the previous solution in this case, there is no need to update reported average CQI to match the precoders used for PDSCH. Moreover, eNodeB has to assume that the reported CQI is based on proprietary precoding matrices rather than the predefined precoding matrices. Contrary to the previous solution, UE behavior at the starting stage must be defined when there is no scheduled PDSCH available to extract PDSCH precoders. The method according to the invention would then further comprise to compute received channel coefficients using non precoded reference signals, and then to extract precoding matrices used for received precoded reference signals using the computed received channel coefficients.

Figure 7:
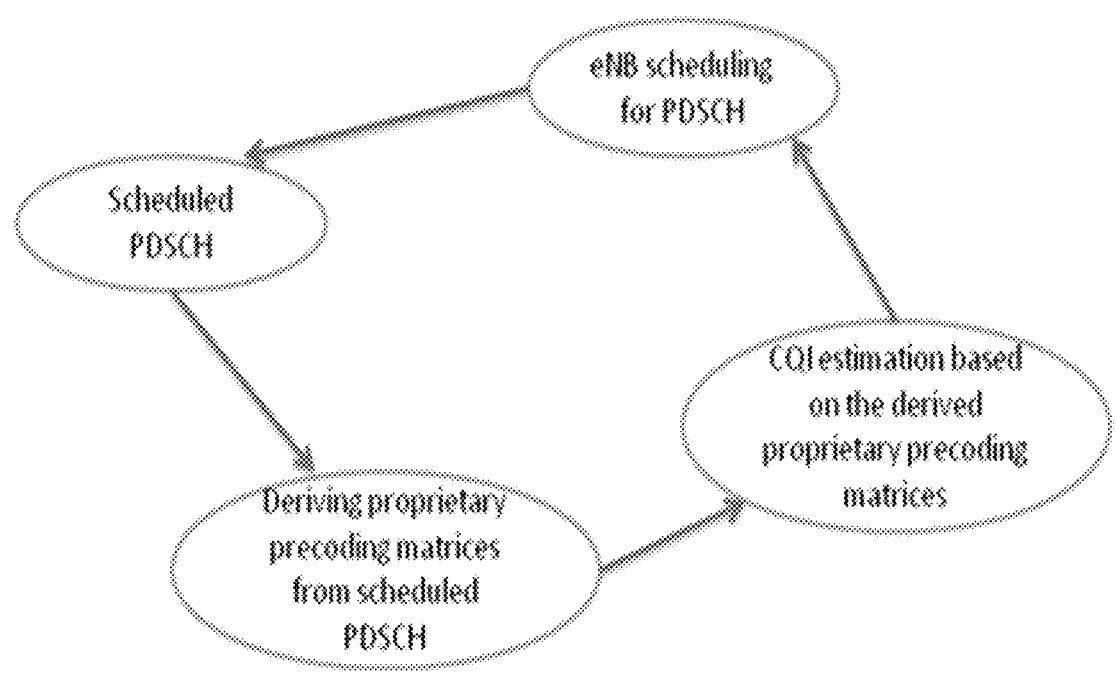
FIG. 7 illustrates derivation of Channel Quality Information (CQI) from scheduled PDSCH based on proprietary precoding matrices.

For example, eNB can assume that at the beginning CQI is estimated using predefined precoding matrices, and then use the reported CQI for PDSCH scheduling. Therefore, PDSCH scheduling can be initiated by eNodeB. Once PDSCH scheduling is started, it is signaled that CQI estimates will be performed based on proprietary precoding matrices as illustrated in FIG. 7.

The present invention optimizes the precoding performance at high mobility in the context of using UE-specific reference signals. The benefit is to reuse the designed UE-specific reference signal for simplification and avoid the signaling of precoding matrix while using several precoders over one RB.

The implementation details of the method of the invention would be clear to a person skilled in the art. For instance, some sort of radio transmitter adapted to do transmissions in accordance with any variant of the method of the invention would be employed for transmitting radio waves, and the transmitter would be chosen to suit the requirements in view of for instance frequency band, transmission power, etc. Such a transmitter would for instance be a radio basestation in the mobile communications system. Also, a receiver or a user equipment adapted to receive a transmission from the radio transmitter according to the invention would be employed to actually receive the transmissions.

In each of these devices, some sort of computing device, such as a micro controller, a digital signal processor, or a microprocessor, could be used to implement different features of the method of the invention such as to employ different signalling schemes etc. The computing device could be a standalone device or integrated in another device such as an ASIC or a FPGA.

What is claimed is:

1. A radio transmitter configured to transmit data in an open loop transmission in a wireless multiple antenna radio communications system,
wherein the radio transmitter includes a processor that;
provides for data transmission with a transmission rank r, wherein r is an integer value being larger or equal to 1,
communicates resource units (RU) containing resource elements (RE),
provides N available Demodulation Reference Signals (DM-RS) for communication channel estimation in each RU,
provides a number of M REs in each RU for data transmission, and
provides a number of E REs in each RU allocated for DM-RS transmission,
wherein the radio transmitter further includes a mapper that is configured to:
apply a number of more than r, NUsed, of DM-RS:s, NUsed≤N, to the E allocated REs;
wherein the number of E REs is greater than the transmission rank r, and wherein the number of NUsed DM-RS:s is less than the number of E REs, wherein each of the NUsed DM-RS in an RU defines one antenna port and there are NUsed defined antenna ports, and wherein each of the M REs for data transmission is associated with r of NUsed defined antenna ports.

2. The radio transmitter according to claim 1, further configured to:
use at least L≥2 different precoding matrices to precode the M REs in at least one RU for at least one certain rank r transmission such that REs precoded with a first precoding matrix are interleaved with REs precoded with at least one additional, a second different precoding matrix.

3. The radio transmitter according to claim 2, wherein the number of used precoding matrices L is adapted to the transmission rank r and number N of available DM-RS.

4. The radio transmitter according to claim 1, wherein the number N of available DM-RS depends on the number E of REs allocated for DM-RS:s in an RU and a length of code used for Code Division Multiplexing of DM-RS:s over the E REs.

5. The radio transmitter according to claim 1, wherein one resource unit is one Resource Block Pair in a Long Term Evolution mobile communications system.

6. The radio transmitter according to claim 1, wherein:
E=12 REs are used in one RU for DM-RS,
rank is chosen as either of 1 or 2,
a length of code-division multiplexing (CDM) code is 4 and there are N=4 CDM DM-RS available, and
number L of used precoding matrices is a largest integer smaller than N/r.

7. The radio transmitter according to claim 1, wherein
E=24 REs are used in one RU for DM-RS,
rank is chosen as either of 3 or 4,
a length of CDM code is 4 and there are N=8 CDM DM-RS available, and
number L of used precoding matrices is a largest integer smaller than N/r.

8. The radio transmitter according to claim 1, wherein:
the same number N of available DM-RS:s are used for different rank r transmissions, and
a number of used precoding matrices is a largest integer smaller than N/r.

9. The radio transmitter according to claim 1, wherein:
the number of available DM-RS for different rank r transmissions is $N_r$,
the same number of L precoding matrices is used for each transmission rank r, and
Number $N_{Used}$ of used DM-RS≤$N_r$ available DM-RS for each rank r transmission is $N_{Used}=L*r$.

10. The radio transmitter according to claim 9, wherein:
the number of available DM-RS $N_r$ for different rank r transmissions is the same.

11. The radio transmitter according to claim 1, further configured to:
use cycling of L≥2 precoding matrices in a RU or in consecutive RUs.

12. The radio transmitter according to claim 11, further configured to:
perform layer permutation by permuting columns of the L precoding matrices and then use the permuted precoding matrices for precoding.

13. The radio transmitter according to claim 1, wherein:
each data transmission RE is associated with same antenna ports with different order.

14. The radio transmitter according to claim 1, further configured to:
signal a scheme of used L precoding matrices to a receiver of precoded REs in the system.

15. The radio transmitter according to claim 1, further configured to:
compute received channel coefficients using non precoded reference signals; and
extract precoding matrices used for received precoded reference signals using the computed received channel coefficients.

16. A wireless multiple antenna radio communications system including a radio transmitter and a user equipment configured to receive a transmission from the radio transmitter, wherein the radio transmitter:

provides for data transmission with a transmission rank r, wherein r is an integer value being larger or equal to 1,
communicates resource units (RU) containing resource elements (RE),
provides N available Demodulation Reference Signals (DM-RS) for communication channel estimation in each RU,
provides a number of M REs in each RU for data transmission, and
provides a number of E REs in each RU allocated for DM-RS transmission, and
wherein the user equipment is further configured to receive a precoded data transmission,
wherein a number of more than r, NUsed, of DM-RS:s, NUsed≤N, is applied to the E allocated REs; wherein the number of E REs is greater than the transmission rank r, and wherein the number of NUsed DM-RS:s is less than the number of E REs; wherein each of the NUsed DM-RS in an RU defines one antenna port and there are NUsed defined antenna ports; and wherein each of the M REs for data transmission is associated with r of NUsed defined antenna ports.

17. The wireless multiple antenna radio communications system according to claim 16, wherein in the radio transmitter: at least L≥2 different precoding matrices are used to precode the M REs in at least one RU for at least one certain rank r transmission such that REs precoded with a first precoding matrix are interleaved with REs precoded with at least one additional, a second different precoding matrix.

18. The wireless multiple antenna radio communications system according to claim 16, wherein in the radio transmitter, the number of used precoding matrices L is adapted to the transmission rank r and number N of available DM-RS.

19. The wireless multiple antenna radio communications system according to claim 16, wherein in the radio transmitter:
E=12 REs are used in one RU for DM-RS,
rank is chosen as either of 1 or 2,
a length of code-division multiplexing (CDM) code is 4 and there are N=4 CDM DM-RS available, and
number L of used precoding matrices is a largest integer smaller than N/r.

20. A method for data transmission in an open loop transmission in a wireless multiple antenna radio communications system, wherein the method comprises:
providing for data transmission with a transmission rank r, wherein r is an integer value being larger or equal to one,
communicating resource units (RU) containing resource elements (RE),
providing N available Demodulation Reference Signals (DM-RS) for communication channel estimation in each RU,
providing a number of M REs in each RU for data transmission, and
providing a number of E REs in each RU allocated for DM-RS transmission, and
applying a number of more than r, NUsed, of DM-RS:s, NUsed≤N, to the E allocated REs, wherein the number of E REs is greater than the transmission rank r, and wherein the number of NUsed DM-RS:s is less than the number of E REs, wherein each of the NUsed DM-RS defines one antenna port and there are NUsed defined antenna ports; and wherein each of the M REs for data transmission is associated with r of NUsed defined antenna ports.

* * * * *